United States Patent

Budert

Patent Number: 5,687,844
Date of Patent: Nov. 18, 1997

[54] CASSETTE FOR COMPASS SAW BLADES

[75] Inventor: Günter H. Budert, Bachhagel, Germany

[73] Assignee: Georg Knoblauch, Giengen, Germany

[21] Appl. No.: 599,993

[22] Filed: Jan. 12, 1996

[30] Foreign Application Priority Data

Dec. 1, 1995 [DE] Germany ............ 295 19 081 U

[51] Int. Cl.⁶ ................................................ B65D 85/20
[52] U.S. Cl. ...................... 206/372; 206/561; 206/807
[58] Field of Search ........................ 206/372, 373–377, 206/443, 807, 816, 561, 468

[56] References Cited

U.S. PATENT DOCUMENTS

| | | | |
|---|---|---|---|
| 3,804,238 | 4/1974 | Howard | 206/372 |
| 3,837,477 | 9/1974 | Boudreau | 206/376 |
| 4,561,544 | 12/1985 | Reeve | 206/807 |
| 4,705,168 | 11/1987 | Ward | 206/373 |
| 4,958,732 | 9/1990 | Rau et al. | 206/561 |
| 5,148,914 | 9/1992 | Budert et al. | 206/807 |
| 5,562,212 | 10/1996 | Rosler | 206/443 |

*Primary Examiner*—Paul T. Sewell
*Assistant Examiner*—Luan K. Bui
*Attorney, Agent, or Firm*—Davis and Bujold

[57] ABSTRACT

A cassette for compass saw blades (5) is provided with a base part (1) and a lid part (2) movable in relation to the base part (2). Furthermore housing devices for the compass saw blades (5) are provided. The housing devices for the compass saw blades (5) are constructed as at least two sawtooth shaped support members (3), which are mounted parallel to one another on the base part (1) and transversally to the direction of displacement of the lid part (2) displaceable in relation to the base part (1). The support members (3) in each case contain several supporting faces (6) for the compass saw blades (5), which are inclined towards the plane of the base part (1) and are separated from one another.

8 Claims, 4 Drawing Sheets

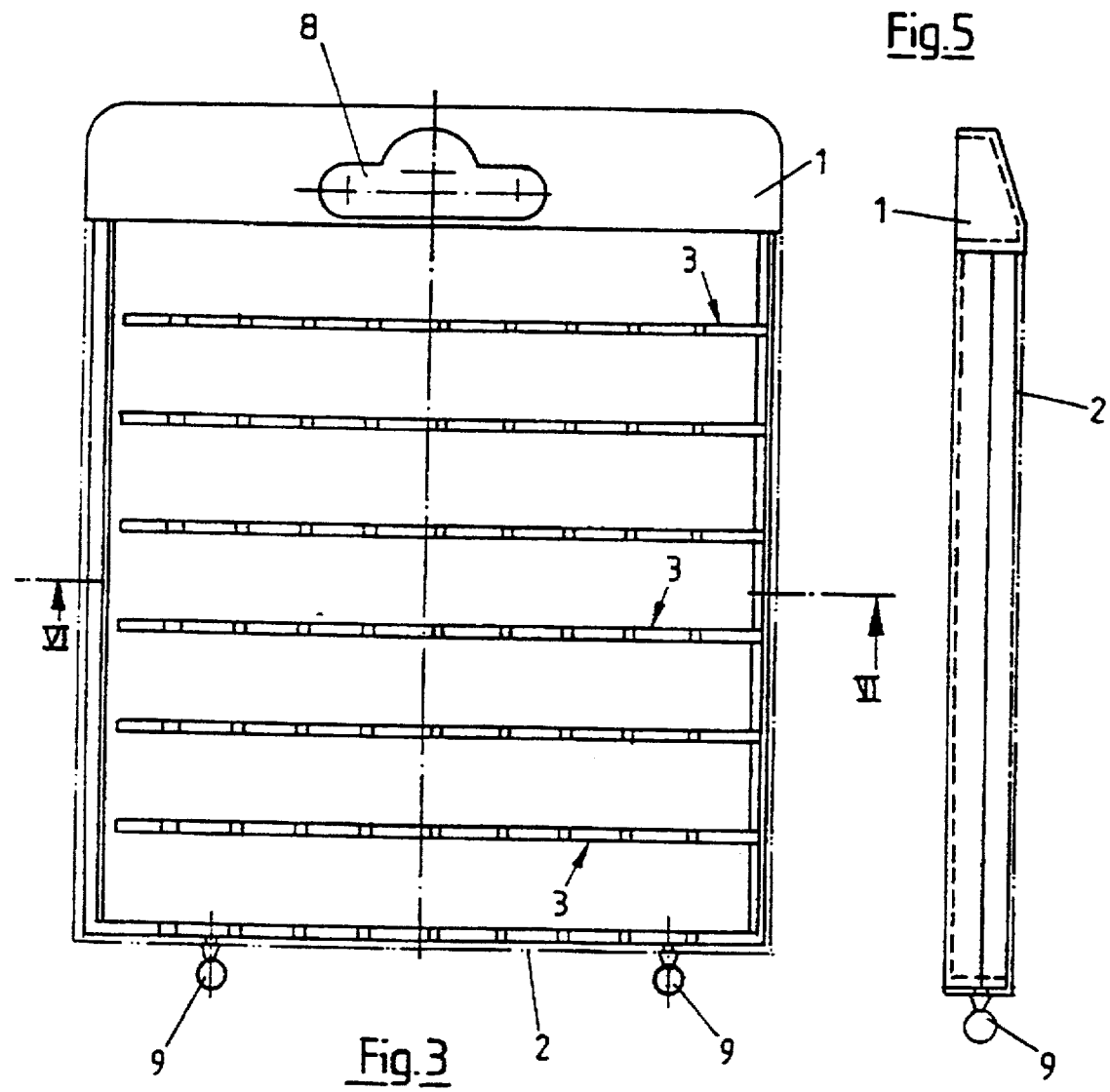

CASSETTE FOR COMPASS SAW BLADES

BACKGROUND OF THE INVENTION

The invention relates to a cassette for compass saw blades, having a base part and a lid part movable in relation to the base part, and having housing devices for the compass saw blades.

Generic cassettes for compass saw blades are known from practical experience.

In this case the lid part is swivellable in relation to the base part around a swivelling axis disposed in the lower region of the base part, with a housing for the compass saw blades having insertion openings being swivellable around the same swivelling axis, so that the housing device with the compass saw blades disposed therein can be swivelled out of the base part.

However a disadvantage of the known cassettes for compass saw blades in that the spatial requirement for accommodating several compass saw blades in such cassettes is relatively large, since the individual compass saw blades are inserted into the housing device, so that by virtue of the provision of the housing device known cassettes have a relatively large overall height.

Furthermore in known cassettes for compass saw blades there is the danger that compass saw blades which are disposed adjacent to one another in the housing device can touch, as a result of which the cutting edges of the individual compass saw blades can be damaged and consequently the service life of the compass saw blades stored in such cassettes may be reduced.

SUMMARY OF THE INVENTION

The object of the present invention is therefore to provide a cassette for compass saw blades in which several compass saw blades can be kept or stored in a space-saving manner and without the danger of damage to the compass saw blades.

This object is achieved in accordance with the invention in that the housing devices for the compass saw blades are constructed as at least two saw-teeth shaped support members, which are mounted parallel to one another on the base part and transversally to the direction of displacement of the lid part, which is displaceable in relation to the base part, with the support members in each case containing several supporting faces for the compass saw blades inclined towards the plane of the base part and separated from one another.

By the design, according to the invention, of the housing devices, in particular the inclined supporting faces with the support members, which may be constructed as bars, it is possible to store several compass saw blades on a relatively small area, without them damaging one another, since by the storage of the compass saw blades on the inclined supporting faces the individual compass saw blades are separated completely from one another with the lid part closed or respectively the cassette closed. This separation is effected by the saw-tooth shaped support members.

The number of the saw-tooth shaped support members provided in the base part, which may also be designated as trapezoidal small supports, may vary depending on the length of the compass saw blades, i.e. in case relatively long compass saw blades are to be stored in the cassette according to the invention, accordingly more saw-tooth shaped support members can be provided than with shorter saw blades in order to avoid a deflection of the long compass saw blades by virtue of their own weight and to ensure secure support on the inclined supporting faces.

In this case it is within the discretion of the person skilled in the art to provide the saw-tooth shaped support members in one piece with the base part if necessary, which is advantageous in particular if at least the base part is produced as a plastic injection moulded part, or also to produce the base part and the support members separately, if necessary also from different materials, and subsequently to connect them with one another in an appropriate manner, for example by bonding or ultrasonic welding.

Of course the base part and/or the lid part and/or the support members may also be produced from metal, as a result of which the stability of the cassette in accordance with the invention is substantially increased.

When manufacturing the lid part from plastics, there is however the advantage that a transparent plastic can be used, as a result of which even if the cassette in accordance with the invention is closed, it can immediately be seen how many and which compass saw blades are located in the cassette.

By the displacability of the lid part in relation to the base part, the cassette according to the invention for compass saw blades may be opened easily and without problems and fast access to the compass saw blades stored in the cassette is possible.

In an advantageous embodiment of the invention it may be specified that the supporting faces are inclined at an angle of 20° to 50°, preferably of 30°, towards the plane of the base part.

In this case the larger the angle of inclination of the supporting faces is, the smaller the width of a cassette for compass saw blades according to the invention is with a constant number of compass saw blades to be stored.

Of course, in the case of too large angles, there is the disadvantage that the cassette according to the invention becomes relatively high.

To reduce further the danger of contact or damage to compass saw blades accommodated in the cassette according to the invention, the lid part may be provided with ribs on its inner side, which are provided at least approximately parallel to the saw blades lying on the supporting faces, i.e. the ribs extend at least approximately parallel to the direction of displacement of the lid part.

The ribs on the inner side of the lid part in this case prevent compass saw blades disposed adjacent to one another from rubbing against one another in the cassette according to the invention. The ribs are provided at such a depth or extend to such a depth into the base part that contact between the compass saw blades is avoided. In practice they act as stop edges.

Of course the base part is provided with suitable recesses through which the ribs are passed when opening and closing the cassette.

In addition, the stability of the lid part, which, as already mentioned, is preferably produced of plastics, is considerably increased by the described arrangement of the ribs.

To enable the cassette in accordance with the invention to be presented well in sales rooms, the base part may have an opening to receive a "Eurohook".

Consequently the cassette in accordance with the invention can be presented without any problems on known display units.

To avoid compass saw blades being inadmissibly removed during the presentation of cassettes according to the invention, security devices may be provided to prevent a movement of the lid in relation to the base part. These theft protection devices or security devices may advantageously contain at least one plastic nipple disposed on the base part, which extends through the lid part, with the plastic nipple having a reduced cross-sectional area in the region of the lid part.

By virtue of the reduced cross-sectional area a simple and inexpensive security device is produced, since the cassette according to the invention as a result has a predetermined breaking point, so that after purchasing the cassette according to the invention a customer can remove the plastic nipples in a simple manner by a bending and/or torsional movement, by which a movement of the lid part in relation to the base part and consequently an opening of the cassette according to the invention is possible. In this case it is within the discretion of the average person skilled in the art to provide a suitable geometric shape of the plastic nipples and the cross-sectional area.

Since several such security devices are preferably provided for each cassette, it is relatively difficult to steal saw blades from a cassette according to the invention before the purchase of said cassette. Moreover cassettes opened illegally can be noticed immediately, since these no long have any plastic nipples.

To enable an easy and rapid opening of the lid part or of the cassette according to the invention, the lid part may be provided with an operating device. The operating device may advantageously be constructed as fluting provided on at least one of the outer sides of the lid part.

Consequently it is possible for an operator of the cassette according to the invention to open the cassette and to remove compass saw blades from the cassette or to insert them into said cassette in a simple manner even when wearing gloves, for example.

However alternatively a handle, a recessed grip or the like could of course be provided on the lid part.

DESCRIPTION OF THE DRAWING

An exemplified embodiment of the present invention is described in principle below by means of the drawings.

FIG. 3 shows a plan view of a cassette in accordance with the invention, FIG. 4 shows a front view of a cassette in accordance with the invention, FIG. 5 shows a side view of a cassette in accordance with the invention.

DETAILED DESCRIPTION OF THE INVENTION

With reference to FIGS. 1 to 5, a cassette for compass saw blades is represented, which comprises a base part 1 and a lid part 2, with the lid part 2 being provided displaceably in relation to the base part 1.

In the base part 1 trapezoidal small supports or saw-tooth shaped bars 3 are provided as support members, whereby in the represented exemplified embodiment a total of six such support members are provided in the base part 1 or are integrated in the base part (see FIG. 3).

Figure 6:
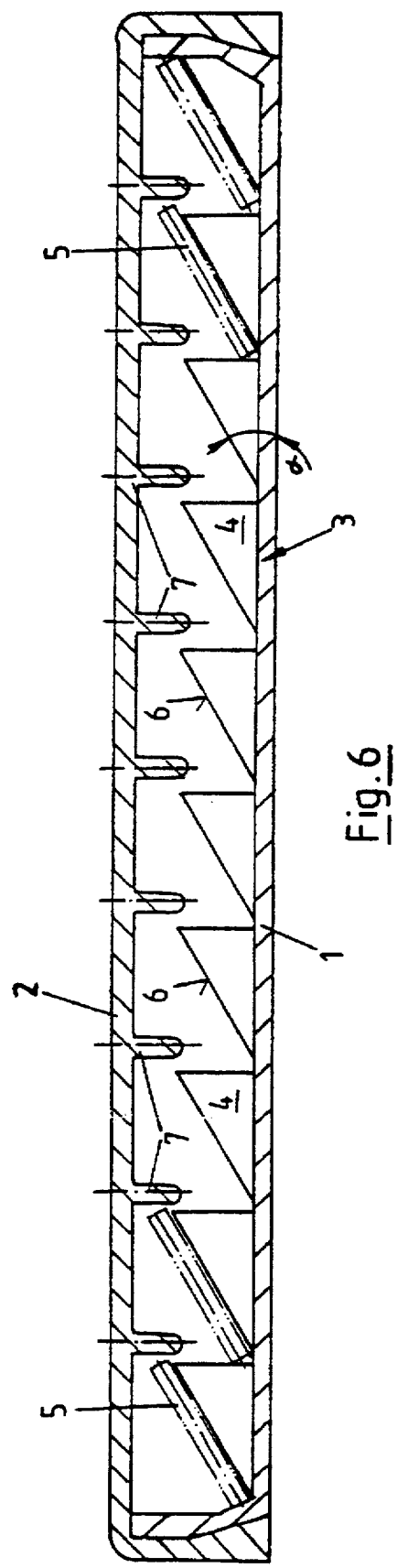
FIG. 6 shows a section along line VI—VI of FIG. 3 on an enlarged scale.

As can be seen from FIG. 6, each saw-tooth shaped bar 3 has a plurality of teeth 4, which have a triangular construction. In the represented exemplified embodiment, a total of ten such teeth 4 per bar 3 are provided, whereby up to ten compass saw blades 5 can be stored in the represented cassette. In this case the teeth 4 can be placed directly on the base part 1 or the teeth 4 may if necessary also be placed on a base bar (not represented), which is attached to the base part 1.

The teeth 4 are provided with supporting faces 6 for the compass saw blades 5, with the supporting faces 6 being inclined at an angle $\alpha$, which in the present exemplified embodiment is 30°, towards the plane of the base part 1.

By this arrangement the compass saw blades 5 can be accommodated in the represented cassette in a place-saving manner and without touching one another, since the individual compass saw blades 5 are completely separated from one another both by the teeth 4 and also by the ribs 7, which will be described below.

To strengthen the lid part 2 and to avoid damage to the compass saw blades 5 by friction or mutual contact, the lid part 2 displaceable in relation to the base part 1 is provided on its inner side, i.e. on its side closer to the support members or bars 3, with the ribs 7, which are disposed parallel to the longitudinal direction of the compass saw blades 5 stored in the cassette.

The base part 1 is provided on its upper side with an opening 8 (see FIGS. 1 and 2) to receive a "Eurohook" (not represented), so that the represented cassette can be suspended and presented in trouble-free manner on display units.

Figure 1:
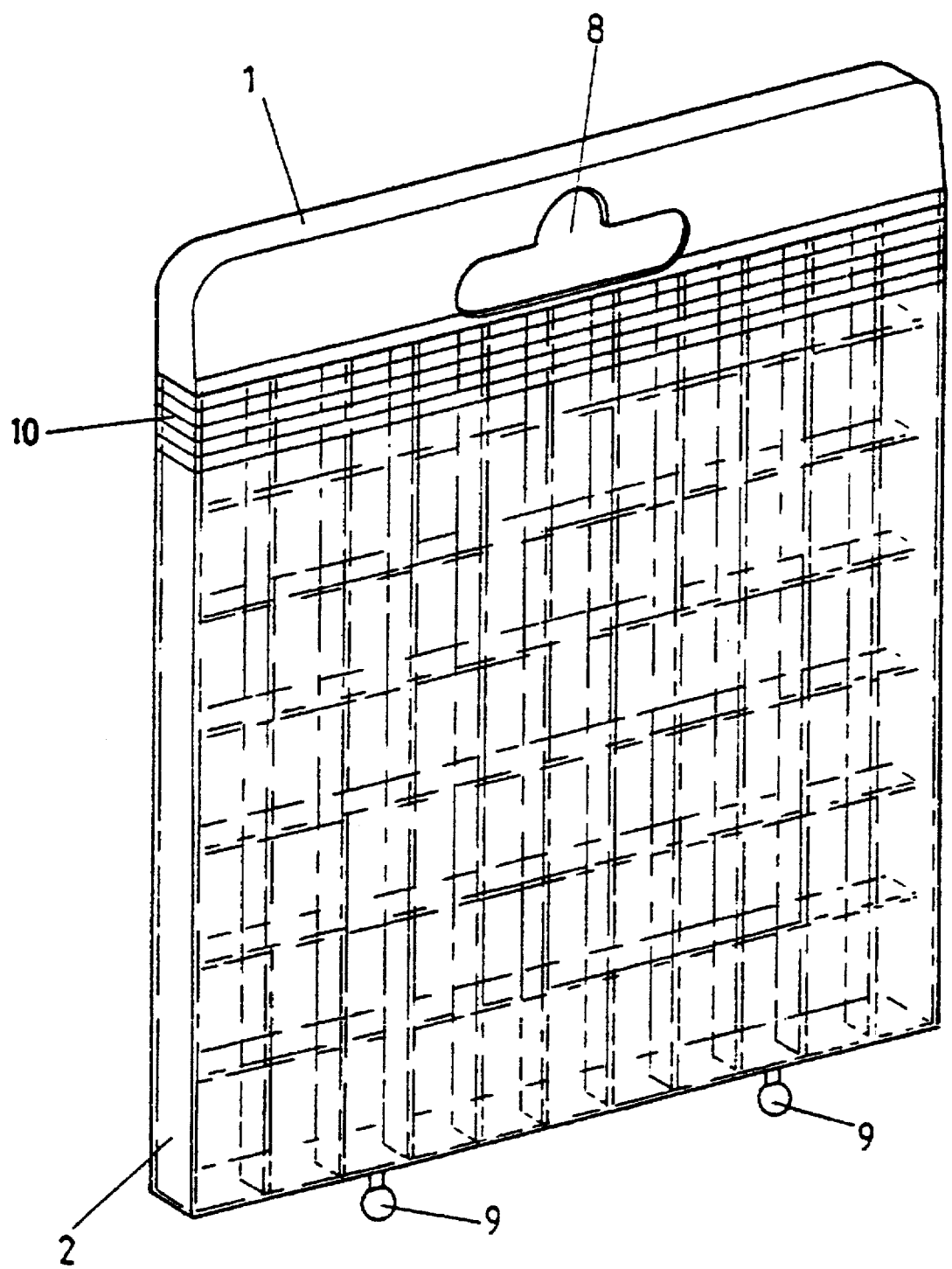
FIG. 1 shows a three-dimensional view of a cassette in accordance with the invention in the closed state.
Figure 2:
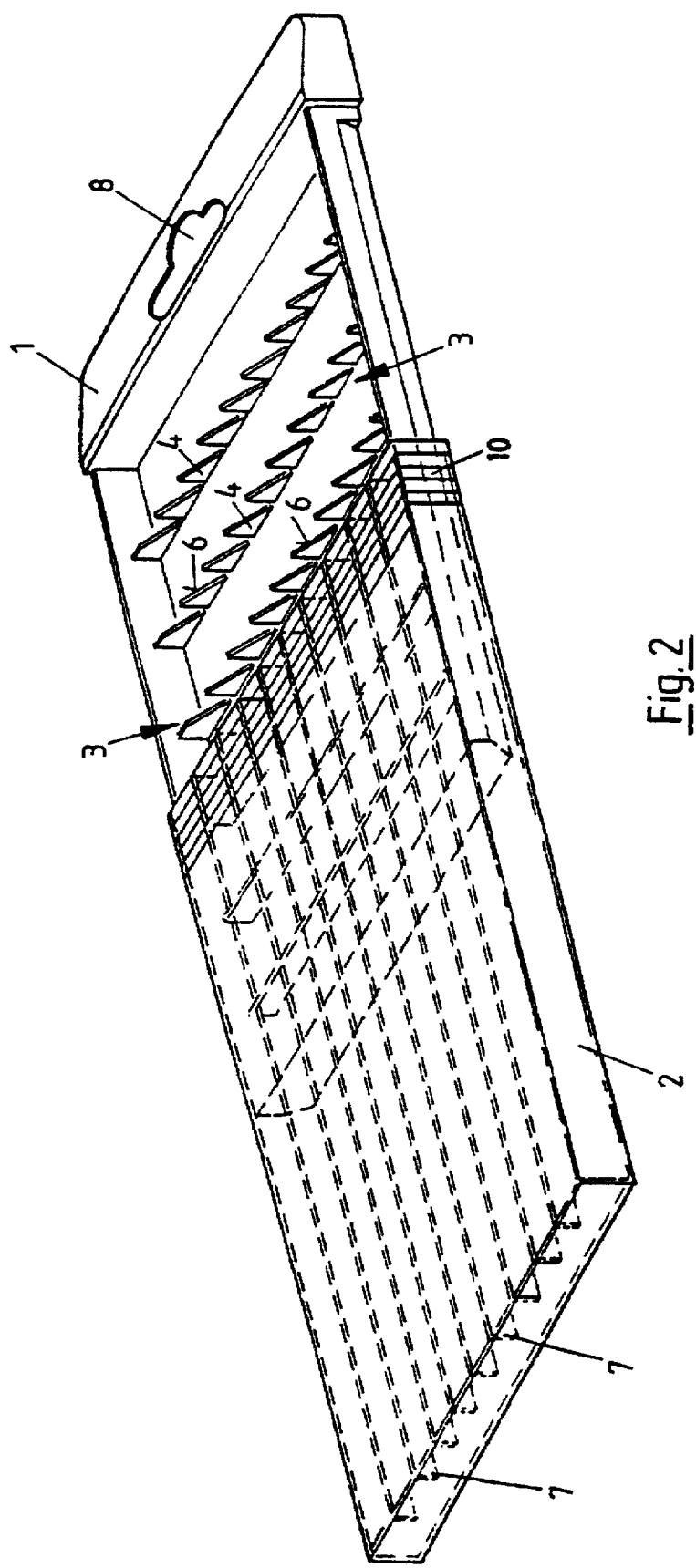
FIG. 2 shows a three-dimensional view of a cassette in accordance with the invention in the open state.

To prevent unauthorised opening of the cassette, i.e. a displacement movement of the lid part 2 in relation to the base part 1, and consequently to avoid the unauthorised removal of compass saw blades 5 from the cassette before purchase, on the underside of the cassette, i.e. at the side remote from the opening 8, two security devices constructed as plastic nipples 9 are provided, which are produced in one piece with the base part 1. The plastic nipples 9 are represented in FIGS. 1 and 3.

The plastic nipples 9 in this case extend through openings or recesses or grooves 11 in the lid part 2, which are correspondingly provided and can be seen in FIG. 4, and consequently prevent an unauthorised opening of the cassette.

So that, after the purchase of a represented cassette, said cassette can be easily opened, i.e. to enable a displacement of the lid part 2 in relation to the base part 1, the plastic nipples 9 have in the region of the lid part 2 a reduced cross-sectional area, with the result that the plastic nipples can be easily removed by a user by appropriate bending and/or torsional movements after the purchase of the cassette and consequently a problem-free opening of the represented cassette is possible.

Of course other security devices may also be used instead of the plastic nipples 9 to prevent an unauthorised opening of the cassette before purchase.

Fluting 10 or the like (not represented) can be provided on the outer sides of the lid part 2 in a simple manner, as a result of which the operation of the lid part 2 to open the cassette is assisted.

The remaining outer faces of the lid part 2 have a smooth design and consequently can be printed or labelled without any problems.

Compass saw blades can be kept in a space-saving and careful manner with the cassette represented and described.

I claim:

1. A cassette for compass saw blades, having a base part and a lid part movable in relation to the base part, and having housing devices for the compass saw blades, characterized in that the housing devices for the compass saw blades (5) are constructed as at least two angular support members (3), which are mounted parallel to one another on the base part (1) and transversely to the direction of displacement of the lid part (2) displaceable in relation to the base part (1), with each supporting member (3) containing several supporting faces (6) for the compass saw blades (5) inclined towards the plane of the base part (1) and separated from one another, and said lid part (2) having ribs (7) on its inner side, which are provided at least approximately parallel to the saw blades (5) lying on the supporting faces (6), said ribs being located so as to prevent the compass saw blades from being displaced when said lid part is closed.

2. A cassette according to claim 1, characterized in that the supporting faces (6) are inclined at an angle of 20 to 50 degrees towards the plane of the base part (1).

3. A cassette according to claim 1, characterised in that the base part (1) has an opening (8) to receive a "Eurohook".

4. A cassette according to claim 1, characterised by security devices (9) to prevent a movement of the lid part (2) in relation to the base part (1).

5. A cassette according to claim 4, characterised in that the security devices contain at least one plastic nipple (9) disposed at the base part (1), which is slidably attached to the lid part (2), with the plastic nipple (9) having a reduced cross-sectional area in the region of the lid part (2).

6. A cassette according to claim 1, characterised in that the lid part (2) is provided with an operating device to open the lid part (2).

7. A cassette according to claim 6, characterised in that the operating device is constructed as fluting (10) provided at least on one of the outer sides of the lid part (2).

8. A cassette according to claim 1, characterized in that the supporting faces (6) are inclined at an angle of 30 degrees towards the plane of the base part (1).

* * * * *